United States Patent [19]

Kolze

[11] 4,352,372

[45] Oct. 5, 1982

[54] PRECISION FLOW CONTROL DEVICE

[75] Inventor: Lawrence A. Kolze, Bensenville, Ill.

[73] Assignee: Eaton Corporation, Cleveland, Ohio

[21] Appl. No.: 207,110

[22] Filed: Nov. 17, 1980

[51] Int. Cl.³ .............................................. G05D 7/01
[52] U.S. Cl. ................................................ 137/504
[58] Field of Search ....................... 137/500, 501, 504

[56] References Cited

U.S. PATENT DOCUMENTS

| | | | |
|---|---|---|---|
| 2,224,216 | 12/1940 | Coberly | 137/504 |
| 2,658,522 | 11/1953 | Coberly | 137/468 |
| 2,909,191 | 10/1959 | Horton | 137/501 |
| 3,351,087 | 11/1967 | Welty | 137/504 |
| 3,565,098 | 2/1971 | Welty | 137/240 |
| 3,586,036 | 6/1971 | Barnes | 137/486 |
| 3,593,742 | 7/1971 | Taylor | 137/504 |
| 3,602,252 | 8/1971 | Barnes | 137/501 X |
| 3,805,824 | 4/1974 | Robbins | 137/504 |

*Primary Examiner*—Robert G. Nilson
*Attorney, Agent, or Firm*—C. H. Grace; F. M. Sajovec

[57] ABSTRACT

A flow control device (10) is disclosed for achieving precision flow control over a wide range of inlet pressures. The device is particularly suited to household appliance applications where energy savings through hot water conservation are imperative. The device comprises a pressure responsive valve member (88) having a flanged portion (92) sealingly connected by a diaphragm (94) to the walls of a fluid chamber (68) defined by housing portions (14), (18). Flow passageways (104) are formed through diaphragm (94) and flange (92). A flow restricting opening is defined by the space between a control orifice (70) and an end surface (91) on the valve member. An axial passageway (106) in the valve member communicates outlet fluid pressure to a compensating chamber (86) sealed from fluid pressure in the control chamber by a diaphragm (112) mounted thereacross and to one end of the valve member (88).

21 Claims, 2 Drawing Figures

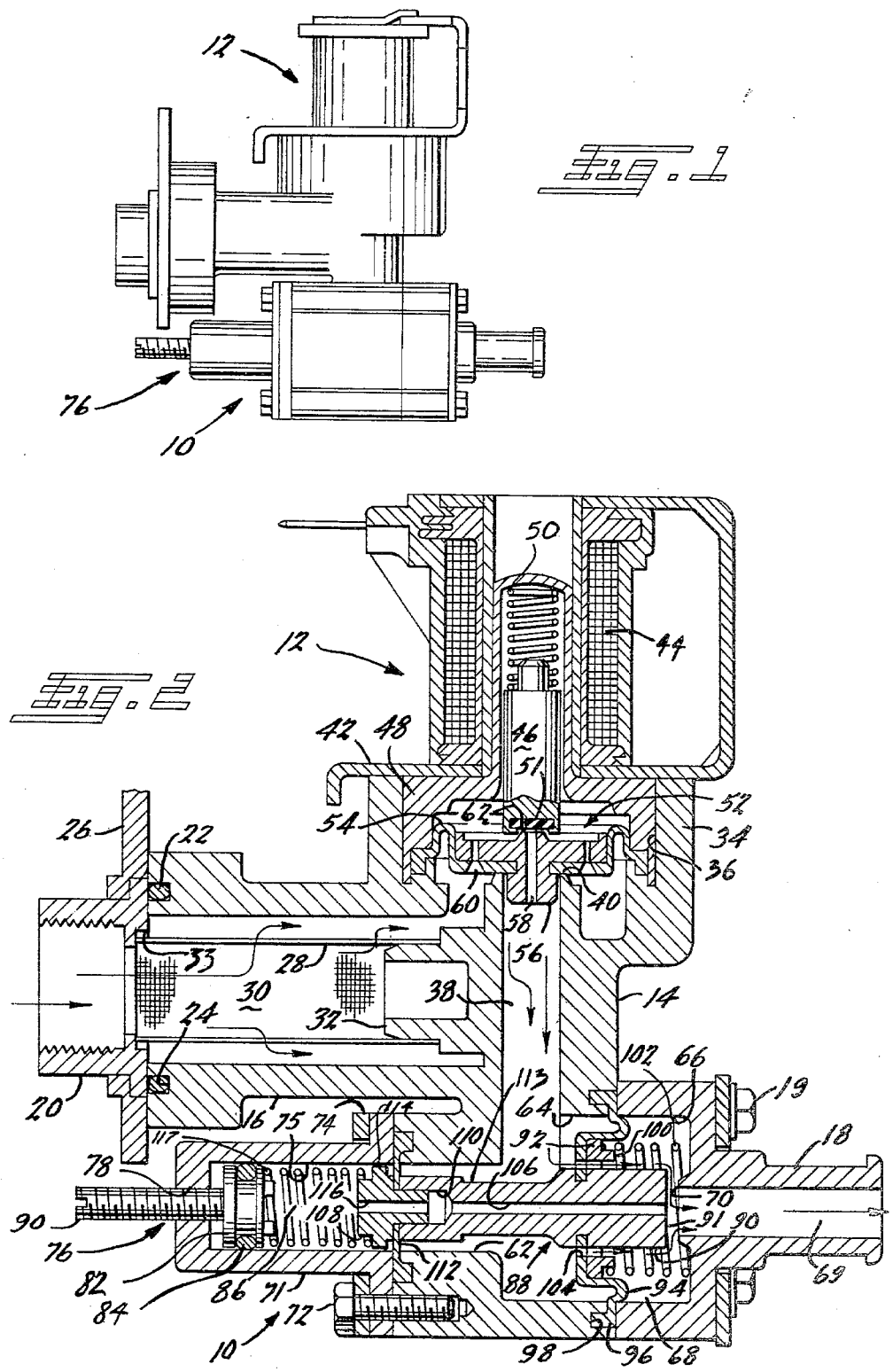

PRECISION FLOW CONTROL DEVICE

BACKGROUND OF THE INVENTION

This invention relates to flow control devices and is particularly directed to devices having precision flow control capability for use in household appliances.

DESCRIPTION OF THE PRIOR ART

Flow control devices of the type having spring biased, pressure responsive control members movable toward and away from a flow control orifice in response to a pressure differential developed across flow passageways in the control member are known in the art. In such known devices, increases in pressure result in increased pressure drop across the control member which results in a reduction in flow area at the flow control orifice. The spring bias on the control member resists movement of the control member due to the pressure differential forces acting on the control member thereby achieving a generally constant flow rate through the control orifice for a given range of inlet pressures.

A performance problem arises with valves of this type when the inlet pressure rises to relatively high values during which flow is unduly restricted through the control orifice as a result of the inability of the biasing spring to balance the forces on the control member. In addition, changes in fluid pressure downstream from the valve outlet also adversely affect the valve response.

Thus, a specific need has arisen for a low cost flow control device for use in household appliances which can provide precision flow control throughout a relatively wide range of inlet pressures. In appliances such as dishwashers and clothes washers precision flow control provides significantly improved water level control and consequently energy savings from reduced hot water usage.

SUMMARY OF THE INVENTION

In the present invention a precision flow control device having a differential pressure compensating fluid chamber and a pressure responsive control member associated therewith is disclosed for controlling flow through an orifice.

The device comprises a housing having a fluid inlet, a fluid outlet, and a fluid chamber. A flow control orifice is disposed upstream from the fluid outlet. The pressure responsive control member comprises an elongated piston having a flanged portion intermediate the fluid inlet and fluid chamber connected to the internal wall of the fluid chamber by a flexible diaphragm. A plurality of flow limiting orifices extend axially through the wall of the flanged portion for permitting fluid flow therethrough. One end of the piston is spaced closely adjacent a control orifice; and, by moving toward or away from the control orifice the piston end face controls flow to the valve outlet. A central passageway is formed through the piston and communicates fluid pressure at the control orifice to a compensating chamber formed by the housing and a flexible diaphragm connected in fluid sealing engagement with the periphery of the piston at the end opposite the end adjacent the control orifice.

A biasing spring is mounted in the compensating chamber and has one end thereof reacting against the housing and the other end reacting against the piston.

The pressure in the compensating chamber functions to balance the pressure drop which would normally occur across the end face of the piston at the control orifice relative to pressure upstream from the flexible diaphragm.

Constant flow rate through the device is achieved by a force equilibrium condition on the piston. At high inlet fluid pressures the equilibrium position of the piston is aligned closely adjacent the flow control orifice to restrict flow therethrough. At lower inlet pressures, the control piston end face is spaced farther from the control orifice to permit greater flow therethrough.

Variations in pressure at the flow control outlet result in changes in the pressure drop across the primary diaphragm, thus enabling the device to respond to fluid pressure variations either upstream or downstream from the flow control.

An externally accessible adjustment nut extends into the compensating chamber for adjusting the preload on the biasing spring.

An electrical solenoid valve is provided and includes a diaphragm valve member which is normally seated against a corresponding valve seat while the valve is in a de-energized state. The valve seat is disposed in the path of fluid flow from the inlet to the fluid chamber and thus functions as a shut-off valve.

It is therefore an object of the invention to provide a flow control device which provides precision flow control across a wide range of inlet fluid pressures.

It is another object of the invention to provide a flow control device which provides precision flow control across a wide range of inlet fluid pressures and which is also responsive to variations in fluid pressures at the outlet of the device.

These and other objects, features, and advantages of the present invention will be understood in greater detail from the following description, reference being had to the accompanying drawings, wherein a preferred embodiment of the present invention is shown.

BRIEF DESCRIPTION OF THE DRAWINGS

FIG. 1 is a view in elevation of a flow control device embodying the principles of the invention; and FIG. 2 is a cross-sectional view of the device of FIG. 1.

DETAILED DESCRIPTION

Referring now to FIGS. 1 and 2, there is indicated generally by reference numeral 10, a precision flow control valve embodying the principle of the invention and shown in association with an electrical solenoid shut-off valve, indicated generally at 12. Valve 10 includes a main housing portion 14 having an integrally molded inlet portion 16 and an outlet portion 18 connected thereto by screws 19. An internally threaded fitting 20 is sealingly connected to the left end of inlet portion 16 by a seal ring 22 mounted in a groove 24. A mounting bracket 26 maintains the fitting in sealing engagement with ring 22 by screws not shown.

A tubular filter screen 28 is mounted in a passageway 30 formed in inlet 16 by having the right end thereof extending over a tubular boss 32 formed on housing 14 and the left end received in a guide bore 33 formed in inlet fitting 20.

Main housing 14 includes an upwardly extending tubular mounting portion 34 which defines a guide bore 36. A vertically aligned inlet passageway 38 is formed in housing 14 and terminates in a valve seat 40. Solenoid shut-off valve 12 is mounted on tubular portion 34 and includes a ferromagnetic mounting bracket 42, an electrical coil 44, an armature 46 slidably received in a nonmagnetic guide casing 48, a biasing spring 50 mounted intermediate casing 48 and the top end of the armature 46, and a rubber valve insert 51 mounted in the end face of armature 46.

Valve 12 includes a pilot operated valve member, indicated generally at 52, comprising a flexible diaphragm 54 captured around the periphery thereof between a groove defined by the lower end of guide casing 48 and surface portions of housing 14. A rigid valve insert 56 is connected to diaphragm 54 and has formed therethrough a pilot passageway 58 aligned with valve insert 51. A plurality of bleed passageways 60 are formed through diaphragm 54 and insert 56 and function to equalize the fluid pressure on each side of diaphragm 54 while valve 12 is in the closed position as shown by FIG. 2. Valve 12 operates in a conventional manner whereupon energization of coil 44, armature 46 moves upwardly which spaces valve insert 51 from a valve seating surface 62 which surrounds the top end of pilot passageway 58. Diaphragm 54 lifts off seat 40 to permit flow into passageway 38, since the diaphragm area acted upon by the pressure differential caused by bleed passage 60 is greater than the diaphragm area acted upon by the pressure differential caused by passage 58.

Horizontally extending bores 62 and 64 are formed into the lower left and right sides of housing 14, respectively, and are in fluid communication with passageway 38. The left side of housing outlet portion 18 is enlarged to define an opening 66 which conforms in size to bore 64 and defines in cooperation therewith a fluid chamber 68. An outlet fluid passageway 69 is formed through outlet housing portion 18 and is in fluid communication with chamber 68. The left end of passageway 69 terminates in a control orifice 70.

A housing cover portion 71 is connected over bore 62 by screws 72 which extend through a flange 74 formed around the right end thereof and into main housing 14. A bore 75 is formed in cover portion 71 and opens to the right and is in alignment with bore 62. A threaded adjustment screw, indicated generally at 76 extends through a threaded bore 78 in the left end of cover portion 71 and includes a threaded end portion 90 and a guide flange 82 slidably received in bore 75. A seal ring 84 is received in an annular groove formed into the outer surface of guide flange 82 and functions to seal pressurized fluid from leaking therepast to the atmosphere.

The space defined by bore 75 is designated as a pressure compensating chamber 86.

A valve member, indicated generally at 88, is mounted in fluid chamber 68 and is in alignment with pressure compensating chamber 86 and outlet passageway 69. Valve member 88 has an elongated configuration with an enlarged diameter portion 90 formed on the right end thereof which is sized slightly larger than control orifice 70. An end face portion 91 of valve member 88 is movable toward and away from control orifice 70 thereby defining a variable area restrictive orifice as will be described subsequently in greater detail. A flange 92 is formed around the periphery of portion 90.

A flexible diaphragm 94 is connected across fluid chamber 68 and clamped around a peripheral bead portion 96 between outlet housing portion 18 and main housing portion 14. Bead 96 is seated in an annular groove 98 in housing 14. The left face of diaphragm 94 is designated as an upstream surface portion.

A tubular projection 100 extends horizontally from the right face of flange 92 and functions as a guide for a spring 102 mounted between flange 92 and the left inside vertical surface of housing outlet portion 18. Spring 102 biases valve member 88 leftward away from control orifice 70.

Either a single orifice or a plurality of circumferentially spaced flow limiting orifices or passageways 104 extend through flanged portion 92 and diaphragm 94 and function to limit but not control flow therepast toward outlet 69.

Valve member 88 includes a central passageway 106 extending axially therethrough. A guide insert 108 is received in a bore 110 formed in the left end of valve member 88 and, is connected thereto by threading or bonding, etc., and functions to clamp therebetween a diaphragm 112. Diaphragm 112 isolates chamber 86 from the fluid pressure existing across the upstream (left) face of diaphragm 94. The left transverse face of insert 108 is designated as a reaction surface.

An outwardly extending flanged portion 114 is sized in closely fitting relationship to bore 75 and functions to radially guide movement of valve member 88. A central passageway 116 extends through guide insert 108 to complete the fluid communication of passageway 106 for linking chamber 86 with fluid pressure at the right end of passageway 106. A spring 117 is disposed within pressure compensating chamber 86 and compressively bears against guide flange 82 in one direction and against flanged portion 114 in the opposite direction to bias valve member 88 rightwardly toward control orifice 70.

Valve member 88 includes an intermediate portion 113 having a reduced diameter which allows free flow of fluid therepast to the upstream surface area of diaphragm 94.

In operation, fluid under pressure enters inlet passageway 38 by first flowing through fitting 20, filter 28, and past valve seat 40 upon energization of solenoid shut-off valve 12 to the open position as shown by the black arrows of FIG. 2.

Flow continues past diaphram 94 by flowing through passageways 104. A pressure drop occurs across diaphragm 94 which tends to move the diaphragm and valve member 88 to the right against the resisting force of biasing spring 102. The fluid pressure at end face portion 91 is communicated through passageways 106 and 116 to pressure compensating chamber 86. Any forces acting on valve member 88 due to either upstream or downstream pressure changes occurring in passageway 69, from the influence of associated fluid components with which flow control valve 10 is connected, will be balanced by an equivalent pressure acting in chamber 86 across an equivalent effective area on the left end of valve member 88. The eventual equilibrium position of end face 91, relative to control orifice 70, is thus a function of the upstream pressure in passageway 38, the downstream pressure in outlet passageway 69, the relative effective areas of diaphragms 94, 112, passageways 104, the effective area of control orifice 70 and the spring rates and spring 102 and 117 forces of biasing springs.

The significant performance advantage provided by the invention is that, by balancing the pressure drop across end face 91 by means of compensating chamber 86 and diaphragm 112, flow is controlled primarily by the pressure drop across passageways 104 acting against the effective area of diaphragm 94 less the effective area of control orifice 70.

Thus a unique feature of the present invention is that the output flow rate from flow control 10 can be decreased or increased by either advancing or retracting adjusting screw 76, respectively. If screw 76 is advanced, the rightward biasing force on valve member 88 is increased, thus resulting in end face 91 moving to an equilibrium position tending to reduce flow through control orifice 70. The opposite effect occurs if screw 76 is retracted.

The embodiment of the invention as shown and described above is representative of the inventive principles stated therein. It is to be understood, however, that variations and departures can be made from the embodiment as shown without departing from the scope of the appended claims.

I claim:

1. A flow control device, said device comprising:
   (a) housing means, said housing means including structure defining,
      (i) a fluid inlet,
      (ii) a fluid outlet,
      (iii) a fluid chamber in fluid communication with said inlet and said outlet,
      (iv) a pressure compensating chamber,
      (v) a flow control orifice in the path of fluid flow from said fluid chamber to said fluid outlet;
   (b) pressure responsive means movable disposed in said fluid chamber, said pressure responsive means including a valve member having an upstream portion in fluid communication with said compensating chamber, and a valve surface portion movable toward and away from said control orifice for throttling flow therethrough;
   (c) first seal means dividing said fluid chamber into an upstream portion and a downstream portion;
   (d) second seal means sealing between said valve member upstream portion and said pressure compensating chamber;
   (e) said pressure responsive means further including means defining at least one flow restricting passageway for communicating fluid past said first seal means;
   (f) means defining a passageway for communicating fluid pressure from said fluid chamber to said compensating chamber;
   (g) means for biasing said valve member toward said control orifice; and
   (h) said valve member movable in response to the net force from fluid flow therepast and said biasing means such that said valve surface portion is positioned relative to said control orifice for controlling flow therethrough to a predetermined rate.

2. The device as defined in claim 1, wherein said passageway defining means comprises said valve member having a passageway extending axially therethrough.

3. The device as defined in claim 1, wherein,
   (a) said valve member has an elongated configuration, and an outwardly projecting flanged portion; and
   (b) said first seal means comprises a flexible diaphragm extending between the walls of said fluid chamber and the periphery of said valve member, said valve member flanged portion having an upstream surface portion in contact with said flexible diaphragm.

4. The device as defined in claim 1, further including adjustment means operably connected to said biasing means for varying the biasing force thereof, said adjustment means including a portion accessible externally of said housing means.

5. The device as defined in claim 1, wherein said first and second seal means are defined by flexible diaphragms.

6. The device as defined in claim 1, wherein said flow restricting passageway means are defined by a plurality of circumferentially spaced, axially extending orifices having predetermined transverse flow areas.

7. The device as defined in claim 1, further comprising a spring mounted in said pressure compensating chamber and having one end thereof reacting against said valve member.

8. A flow control device, said device comprising:
   (a) housing means, said housing means including structure defining,
      (i) a fluid inlet,
      (ii) a fluid outlet
      (iii) a fluid chamber in fluid communication with said inlet and said outlet,
      (iv) a pressure compensating chamber,
      (v) a flow control orifice in the path of fluid flow from said fluid chamber to said fluid outlet;
   (b) pressure responsive means movable in said fluid chamber, said pressure responsive means including a valve member having,
      (i) a valve surface portion movable toward and away from said control orifice;
      (ii) an upstream surface portion disposed in the path of fluid flowing through said fluid chamber, said upstream surface portion including at least one flow restricting passageway therethrough for permitting fluid flow therepast such that a pressure differential is developed thereacross which tends to move said valve member in a downstream direction;
      (iii) a reaction surface portion in fluid communication with said pressure compensating chamber; and
      (iv) an elongated configuration and an outwardly projecting flanged portion;
   (c) said pressure responsive means includes a flexible diaphragm extending between the walls of said fluid chamber and the periphery of said valve member, said valve member flanged portion having an upstream surface portion in contact with said flexible diaphragm;
   (d) means for communicating fluid pressure at said valve surface portion to said pressure compensating chamber;
   (e) means for biasing said valve member away from said control orifice; and
   (f) said valve member movable in response to fluid flow therepast and the force developed by said biasing means such that said valve surface portion aligns relative to said control orifice for controlling flow therethrough to a predetermined rate.

9. A flow control device, said device comprising:
   (a) housing means, said housing means including structure defining,
      (i) a fluid inlet, (ii) a fluid outlet,
(iii) a fluid chamber in fluid communication with said inlet and said outlet,
(iv) a pressue compensating chamber,
(v) a flow control orifice in the path of fluid flow from said fluid chamber to said fluid outlet;
(b) pressure responsive means movable in said fluid chamber, said pressure responsive means including a valve member having,
 (i) a valve surface portion movable toward and away from said control orifice;
 (ii) an upstream surface portion disposed in the path of fluid flowing through said fluid chamber, said upstream surface portion including at least one flow restricting passageway therethrough for permitting fluid flow therepast such that a pressure differential is developed thereacross which tends to move said valve member in a downstream direction; and
 (iii) a reaction surface portion in fluid communication with said pressure compensating chamber;
(c) said pressure responsive means including a first flexible diaphragm connected between the outer periphery of said valve member and the walls of said fluid chamber and a second flexible diaphragm connected to said valve member reaction surface portion and across said pressure compensating chamber;
(d) means for communicating fluid pressure at said valve surface portion to said pressure compensating chamber;
(e) means for biasing said valve member away from said control orifice; and
(f) said valve member movable in response to fluid flow therepast and the force developed by said biasing means such that said valve surface portion aligns relative to said control orifice for controlling flow therethrough to a predetermined rate.

10. The device as defined in claims 8 or 9, wherein said means for communicating pressure to said compensating chamber comprises said valve member having a passageway extending axially therethrough.

11. The device as defined in claims 8 or 9, further including adjustment means operable for varying the biasing force of said biasing means, said adjustment means including a portion accessible externally of said housing means.

12. The device as defined in claims 8 or 9, wherein said at least one flow restricting passageway is defined by an axially extending orifice having a predetermined transverse flow area.

13. The device as defined in claim 12, wherein said flow restricting passageway extends through a flexible diaphragm.

14. The device as defined in claims 8 or 9, further comprising a spring mounted in said pressure compensating chamber and having one end thereof reacting against said valve member reaction surface portion.

15. A flow control device, said device comprising:
(a) housing means, said housing means including structure defining,
 (i) a fluid inlet,
 (ii) a fluid outlet,
 (iii) a fluid chamber in fluid communication with said inlet and said outlet,
 (iv) a pressure compensating chamber,
 (v) a flow control orifice in the path of fluid flow from said fluid chamber to said fluid outlet;
(b) pressure responsive means movable in said fluid chamber, said pressure responsive means including a valve member having,
 (i) a valve surface portion movable toward and away from said control orifice;
 (ii) an upstream surface portion disposed in the path of fluid flowing through said fluid chamber, said upstream surface portion including at least one flow restricting passageway therethrough for permitting fluid flow therepast such that a pressure differential is developed thereacross which tends to move said valve member in a downstream direction, said at least one flow restricting passageway being defined by an axially extending orifice having a predetermined transverse flow area extending through a flexible diaphragm;
 (iii) a reaction surface portion in fluid communication with said pressure compensating chamber;
(c) means for communicating fluid pressure at said valve surface portion to said pressure compensating chamber;
(d) means for biasing said valve member away from said control orifice; and
(e) said valve member movable in response to fluid flow therepast and the force developed by said biasing means such that said valve surface portion aligns relative to said control orifice for controlling flow therethrough to a predetermined rate.

16. A flow control device, said device comprising:
(a) housing means, said housing means including structure defining,
 (i) a fluid inlet,
 (ii) a fluid outlet,
 (iii) a fluid chamber in fluid communication with said inlet and said outlet,
 (iv) a pressure compensating chamber,
 (v) a flow control orifice in the path of fluid flow from said fluid chamber to said fluid outlet;
(b) pressure responsive means movable in said fluid chamber, said pressure responsive means including a valve member having,
 (i) a valve surface portion movable toward and away from said control orifice;
 (ii) an upstream surface portion disposed in the path of fluid flowing through said fluid chamber, said upstream surface portion including at least one flow restricting passageway therethrough for permitting fluid flow therepast such that a pressure differential is developed thereacross which tends to move said valve member in a downstream direction;
 (iii) a reaction surface portion in fluid communication with said pressure compensating chamber;
(c) means for communicating fluid pressure at said valve surface portion to said pressure compensating chamber;
(d) means for biasing said valve member away from said control orifice;
(e) a spring mounted in said pressure compensating chamber and having one end thereof reacting against said valve member reaction surface portion; and
(f) said valve member movable in response to fluid flow therepast and the force developed by said biasing means such that said valve surface portion aligns relative to said control orifice for controlling flow therethrough to a predetermined rate.

17. The device as defined in claims 15 or 16, wherein said means for communicating pressure to said compensating chamber comprises said valve member having a passageway extending axially therethrough.

18. The device as defined in claims 15 or 16, further including adjustment means operably connected to said biasing means for varying the biasing force thereof, said adjustment means including a portion accessible externally of said housing means.

19. The device as defined in claim 15, wherein said biasing means includes a spring mounted in said pressure compensating chamber and having one end thereof reacting against said valve member reaction surface portion.

20. The device as defined in claim 16, wherein said at least one flow restricting passageway is defined by an axially extending orifice having a predetermined transverse flow area.

21. The device as defined in claim 20, wherein said flow restricting passageway extends through said flexible diaphragm.

* * * * *